United States Patent

[11] 3,583,340

| [72] | Inventors | Frank L. Dahl<br>5248 W. 119th Place, Inglewood 90304;<br>John Robier, 1628 Gundry, Paramount,<br>Calif. 90723 |
|---|---|---|
| [21] | Appl. No. | 888,438 |
| [22] | Filed | Dec. 29, 1969 |
| [45] | Patented | June 8, 1971 |

[54] PATTERN MEANS, PATTERN-FOLLOWING MEANS, AND SERVO MEANS CONTROLLED THEREBY
20 Claims, 15 Drawing Figs.

| [52] | U.S. Cl. | 112/118 |
|---|---|---|
| [51] | Int. Cl. | D05f 11/00, D05f 35/00 |
| [50] | Field of Search | 112/117–119 |

[56] References Cited
UNITED STATES PATENTS

| 2,837,046 | 6/1958 | Carson et al. | 112/118 |
|---|---|---|---|
| 3,465,697 | 9/1969 | Gerlach et al. | 112/118 |
| 3,492,957 | 2/1970 | Landoni | 112/118 |
| 3,500,778 | 3/1970 | Landoni | 112/118 |

*Primary Examiner*—Patrick D. Lawson
*Assistant Examiner*—G. V. Larkin

ABSTRACT: Servo apparatus for producing movement in one or more directions (and, in a preferred form, in two mutually perpendicular directions) as a function of movement-instruction-sensing means effectively coupled to and/or comprising a part of the servo apparatus and cooperable with respect to a relatively moving movement-instruction-record means (which in a preferred form can be interchanged at will)—said movement-instruction-record means being provided with a record strip means extending longitudinally therealong and adapted to be followed by a following head means of the above-mentioned movement-instruction-sensing means for providing complete information to the servo apparatus for causing corresponding powered movement in one or more directions (in a preferred form in two mutually perpendicular directions) of a corresponding auxiliary object, or plurality of auxiliary objects, in a desired preprogrammed manner. For example, in one exemplary and nonspecifically limiting form of the apparatus wherein it is employed in association with a quilting machine for producing sewn, composite, quilted material bearing a desired pattern of sewing thereon, the servo apparatus may include two servomotor means arranged to effectively cause, in one case, longitudinal movement of the quilting material and, in the other case, to cause transverse movement thereof, relative to a plurality of sewing needles in a continuous manner and in a manner in exact accordance with the preprogrammed pattern defined by the above-mentioned record strip means carried by the movement-instruction-record means, although it should be clearly understood that the servo apparatus may control any of a variety of different auxiliary objects for achieving any of a variety of different purposes in accordance with preprogrammed instructions carried by a corresponding movement-instruction-record mean.

PATENTED JUN 8 1971 3,583,340

INVENTORS
FRANK L. DAHL
JOHN ROBIER

INVENTORS
FRANK L. DAHL
JOHN ROBIER

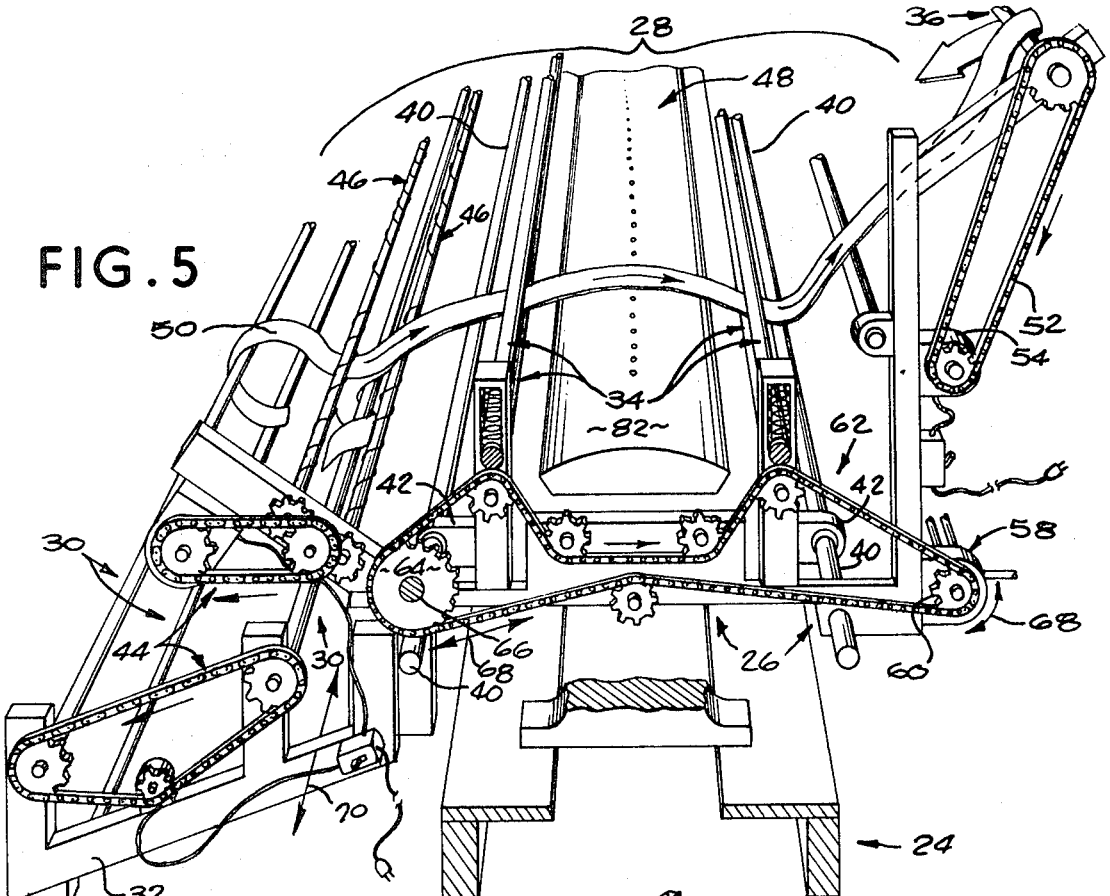
FIG. 5
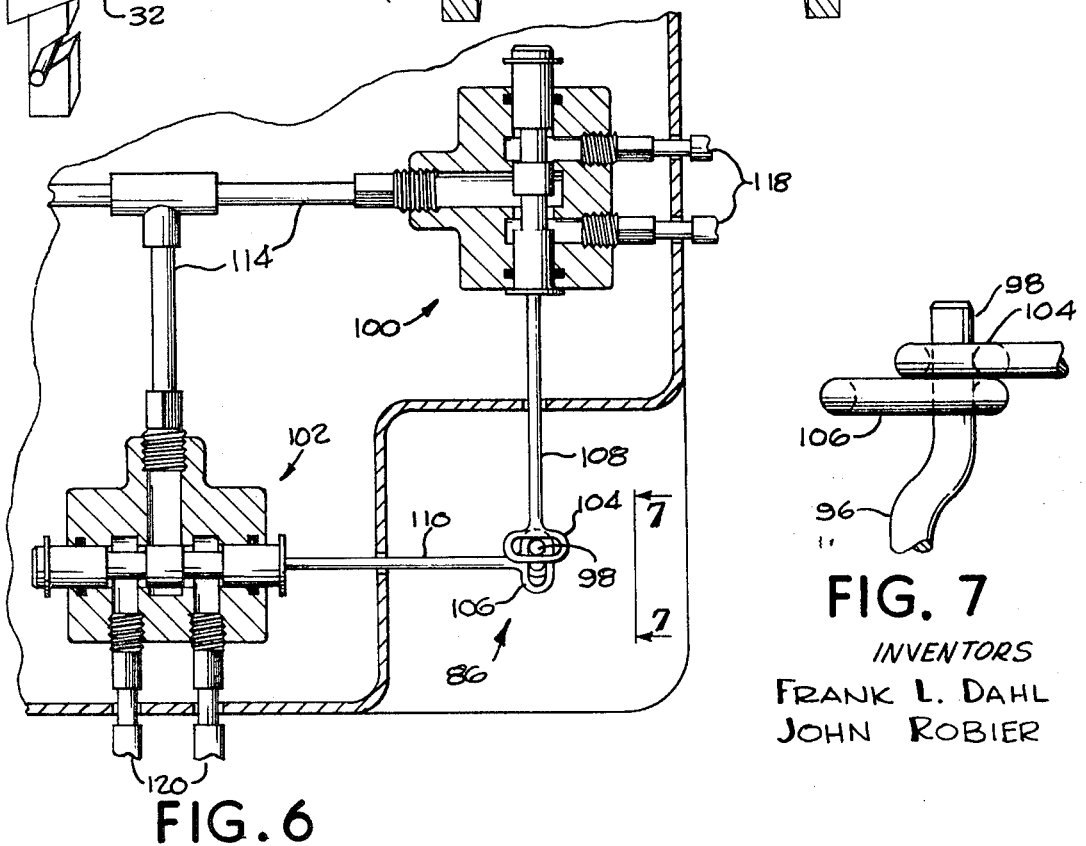
FIG. 6
FIG. 7
INVENTORS
FRANK L. DAHL
JOHN ROBIER

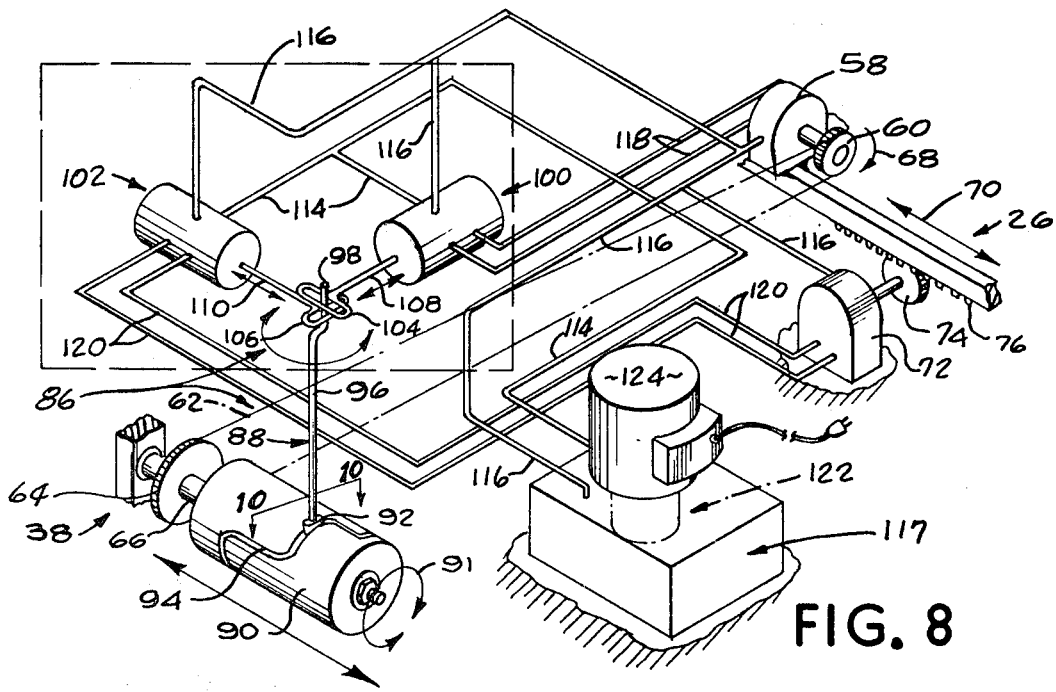
FIG. 8
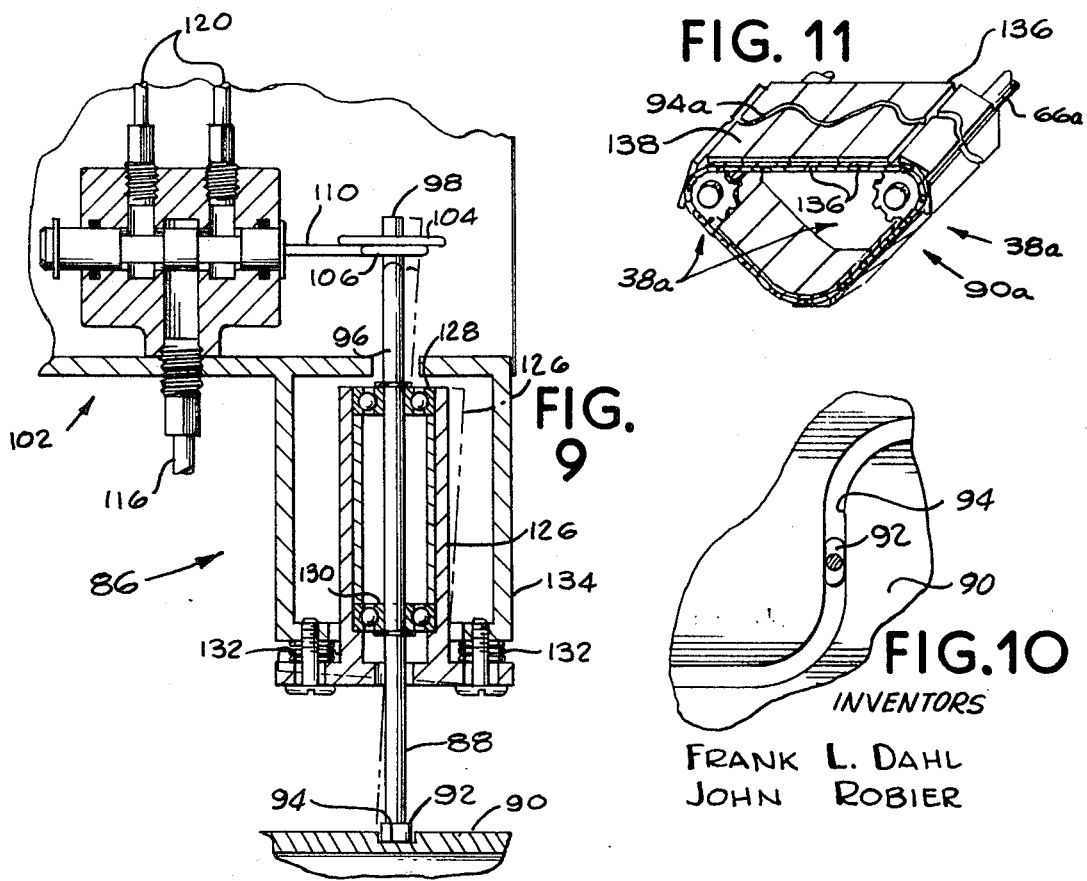
FIG. 9
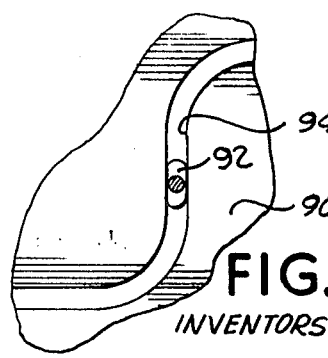
FIG. 11
FIG. 10
INVENTORS
FRANK L. DAHL
JOHN ROBIER

INVENTORS
FRANK L. DAHL
JOHN ROBIER

3,583,340

PATTERN MEANS, PATTERN-FOLLOWING MEANS, AND SERVO MEANS CONTROLLED THEREBY

Generally speaking, the novel servo apparatus and movement-instruction-sensing means of the present invention may be said to include servomotor means adapted to have one or more directional movement-causing outputs driven thereby in a manner exactly corresponding to the preprogrammed movement instructions carried by a movement-instruction-record means adapted to be relatively moved with respect to the movement-instruction-sensing means which effectively reads the preprogrammed movement-causing-and-controlling instructions carried by the movement-instruction-record means.

In one preferred exemplary but nonspecifically limiting form of the invention the above-mentioned servomotor means may include a first servomotor means having an output portion adapted to be effectively coupled with respect to an auxiliary object for causing movement thereof in a first direction, and may also comprise a second servomotor means having an output portion adapted to be effectively coupled with respect to an auxiliary object (which may be the same auxiliary object as that referred to above as being coupled with respect to the first servomotor means, either directly or by way of an intermediary auxiliary object such as a supporting platform or the like, or may comprise a separate auxiliary object) for causing movement thereof in a second direction (which, on one preferred form, is substantially perpendicularly related to the direction of movement produced by said first servo motor means, although not specifically so limited).

Also, generally speaking, the above-mentioned movement-instruction-sensing means, in a preferred form thereof, includes a movement-instruction-record mounting means and a record sensing, perceiving, and reading means cooperable with such a movement-instruction-record means, when mounted on said mounting means, for relative movement with respect to said record sensing, perceiving, and reading means so that the preprogrammed movement-instruction-information carried by the record means (in a preferred form, along a record strip means carried along said record means in a direction having a longitudinal component), may be fully sensed, perceived, read, and communicated to the servomotor means for causing the exact type of movement in each of the two different directions previously mentioned of the auxiliary object (or plurality of such auxiliary objects) preprogrammed into the record strip means.

In one preferred form, the reading of the record strip means by the record sensing, perceiving, and reading means is accomplished by the provision of a following head means of a configuration such as to be physically cooperable with respect to the record strip means in a manner adapted to positively follow same during relative movement therealong and with said following head means being mounted for angular rotation and displacement according to the angular direction and orientation of the corresponding portion of the record strip means (which, in one preferred form, may comprise a groove in the record means, with the following head means being of a nonround shape and being positioned in said groove means in a positive following manner) so that angular displacement of the following head means will cause a corresponding operation of an output control operating portion of the movement-instruction-sensing means which, in turn, will correspondingly operate first and second control means to an extent respectively determined by the particular angular displacement of the following head means in a manner controlling the operation of the first and second servomotor means in a corresponding output-modifying manner so as to bring about exactly the desired movement of the auxiliary object (or plurality of auxiliary objects) coupled to the output portions of said first and second servomotor means.

One preferred form of the present invention also includes feedback means having a first portion effectively coupled to, and causing effective movement of, the movement-instruction-record mounting means relative to the following head means of the movement-instruction-sensing means in a manner exactly corresponding to the relative output movement produced in the related direction by the corresponding one of said servomotor means; said feedback means additionally including a second portion effectively coupled to, and causing effective movement of, the movement-instruction-record mounting relative to the following head means of the movement-instruction-sensing means in a manner exactly corresponding to the relative output movement produced substantially in the related direction by the other corresponding one of said servomotor means—said feedback means operating, in one preferred form of the invention, in a negative feedback sense, although it should be clearly understood that the invention is not specifically limited to the feedback arrangement just generically described.

It should be noted that, in one preferred form of the invention, the above-mentioned control means effectively has input portions cooperable with respect to the output control operating portion of the movement-instruction-sensing means in two different, substantially mutually perpendicularly related manners such that different angular sectors of the complete range of angular movement of the following head means will correspondingly operate different ones of said two control means in a manner such as to cause the two differently directed output movements of the two different servomotor means controlled thereby to effectively vectorially combine in the precise manner intended by, and comprising a function of, the angular direction of the corresponding portion of the record strip means (groove, in a preferred form) instantaneously read by the following head means.

It should also be noted that, in a preferred form of the present invention, the movement-instruction-record means may comprise a continuous loop or belt bearing a continuous length of record surface therealong (usually along the outer surface thereof, although not specifically so limited) with said continuous loop or belt, in one preferred form, comprising a plurality of effectively pivotally interconnected, end-to-end positioned panel portions thereof provided on an acceptable surface (usually the outer surface) thereof with a continuous length of record strip means in the form of a recessed groove in one preferred form of the invention (although not specifically so limited) and with the entire continuous loop or belt comprising said record means being physically separate from and, therefore, removably interchangeably mountable on the record mounting means so that any desired movement-instruction-record means can be quickly mounted in operative, controlling relationship relative to the servomotor means for causing the operation thereof in any of a plurality of different desired, preprogrammed manners.

In one particular, exemplary application of the novel apparatus of the present invention, it may be associated with, and comprise a part of, a quilting machine having a table or platform means provided with a plurality of thin-sheet quilting-material-positioning rollers carried thereby and adapted to hold such quilting material during the continuous movement thereof through the roller means in what might be termed an intermediate sewing region positioned adjacent to a plurality of power reciprocatable needle means (and associated thread means) so that the plurality of needle means (and thread means) can be reciprocated through, and sew an effective pattern onto, the quilting material as it continuously passes through the intermediate sewing region, which will produce a desired pattern thereon by reason of the fact that one of the previously mentioned servomotor means controls the speed of movement (forward and back as required by the pattern, although the net movement is forward) of the quilting material through the intermediate sewing region in what might be termed a longitudinal direction while the other of the previously mentioned servomotor means is arranged to shift the quilting material and, indeed, the entire platform or table means carrying the rollers holding the quilting material in the intermediate sewing region in a direction transverse to the previously mentioned longitudinal direction of feeding flow of the quilting material past the intermittently reciprocating power needle means.

The relationship between the longitudinal movement of the quilting material and its transverse movement, produced by the corresponding operation of the two servomotor means, will be such as to produce exactly a desired pattern on the quilted material corresponding to that preprogrammed into the movement-instruction-record means by means of the angular direction and orientation of the corresponding record strip means (groove, in a preferred form of the invention) read by the following head means of the movement-instruction-sensing means and, correspondingly, controlling the operation of the two servomotor means.

Of course, in this exemplary, but nonspecifically limiting, application of the invention to a quilting machine, suitable quilting material handling means may be provided, such as a plurality of quilting-material-component supply reel (mandrel) means to carry and supply the various different layers of material which will comprise the fully laminated quilting material, a plurality of quilting material drive means, usually in the form of driven, opposed roller means under the control of the one of the previously mentioned servomotor means causing longitudinal movement of the quilting material, and quilting material takeup reel (mandrel) means adapted to take up the fully patterned, sewed quilting material after it passes through the machine.

With the above points in mind, it is an object of the present invention to provide a novel servo apparatus and/or movement-instruction-sensing means for controlling the operation thereof and cooperable with respect to a movement-instruction-record means—the invention comprising the servo apparatus and the movement-instruction-sensing means per se, the movement-instruction-record means per se, and the complete combination thereof, and being adapted to control any desired number of servomotor means for producing virtually any desired type of output movement control of one or more auxiliary objects for any of a variety of purposes wherein such pattern following movement is a requisite to the achievement of the desired purposes or objectives.

It is a further object of the present invention to provide a novel servo apparatus and/or movement-instruction-sensing means therefor, and/or movement-instruction-record means therefor, wherein angular direction and orientation of a following head means of a sensing, perceiving, and reading means of the movement-instruction-sensing means and/or corresponding angular direction and orientation of a corresponding portion of a record strip means carried by the movement-instruction-record means provide the information for controlling the servomotor means.

It is a further object of the present invention to provide apparatus of the type generically referred to herein in one particular, specific, but nonlimiting application thereof, wherein it comprises a part of a quilting machine adapted for use in producing any desired pattern on quilting material, or the like, in a rapid and effective manner and in exact accordance with preprogrammed movement-instruction-information carried by a record strip means on a movement-instruction-record means.

It is a further object of the present invention to provide novel apparatus of the character referred to herein, having any or all of the advantages referred to herein and including any or all of the features referred to herein, generically and/or specifically, individually or in combination, and which is of an extremely adaptable nature as to the ultimate purpose and type of apparatus to be controlled thereby such as to facilitate the widespread and large-scale manufacture, sale, and use of the invention for the purposes outlined herein or for any of the many other substantial functional equivalents thereof.

Further objects are implicit in the detailed description which follows hereinafter (which is to be considered as exemplary of, but not specifically limiting, the present invention), and said objects will be apparent to persons skilled in the art after a careful study of the detailed description which follows hereinafter, and all such implicit objects are intended to be included and comprehended herein as fully as if particularly defined and pointed out herein.

For the purpose of clarifying the nature of the present invention, several exemplary, but nonspecifically limiting, embodiments of the invention are illustrated in the hereinbelow-described figures of the accompanying four sheets of drawings and are described in detail hereinafter.

FIG. 1 is a greatly reduced-size, somewhat simplified and slightly diagrammatic perspective view of one exemplary embodiment of the invention wherein it is associated with, and effectively comprises the operating and control portion of, a power sewing apparatus which in one preferred but nonspecifically limiting form, may be said to comprise a quilting machine for sewing a desired pattern on quilting material, although it may be readily adapted for sewing any other thin-sheet material in any desired pattern as well, and reference herein to a quilting machine should be broadly construed to encompass all such variations.

FIG. 1A is a fragmentary partly broken away perspective view of a vertically intermediate portion of the quilting machine of FIG. 1 illustrating the needle-carrying power head unit or structure adapted to be vertically reciprocated relative to the intermediate sewing region as quilting material is passed therethrough in a longitudinally and laterally variable manner controlled by first and second servomotor means for the purpose of producing a sewn pattern on the quilting material comprising a plurality of sewing lines corresponding to the number of sewing needles carried by the power head of FIG. 1A following similar lateral and longitudinal patterns as determined by the movement-instruction-record means and the reading thereof by the movement-instruction-sensing means.

FIG. 2 is a fragmentary, partially broken away view, taken substantially along the plane and in the direction indicated by the arrows 2-2 of FIG. 1, and is primarily for the purpose of illustrating the slidable mounting of the transversely or laterally movable platform or table means which carries what might be termed the quilting material (or thin-sheet) handling means of the quilting machine, handling the various components of the quilting material and also carrying the movement-instruction-record-mounting means of the movement-instruction-sensing means, in one exemplary form, and certain other portions of the apparatus of the present invention exclusive of the record sensing, perceiving, and reading means portion of the movement-instruction-sensing means.

FIG. 3 is an enlarged, fragmentary, partly broken away view, taken substantially along the plane and in the direction indicated by the arrows 3-3 of FIG. 2, and most clearly shows one of the servomotor means of the servo apparatus which causes transverse movement of the thin-sheet quilting material (the previously mentioned, so-called auxiliary object) through intermediary means comprising the table or platform means mentioned in the immediately preceding brief description of FIG. 2, which is directly transversely driven by said servomotor means.

FIG. 4 is a greatly enlarged, fragmentary, partially broken away view of a part of the near end portion of the apparatus as shown in FIG. 1, which primarily comprises the novel servocontrol apparatus, movement-instruction-sensing means, and movement-instruction-record means of the present invention, in one exemplary form.

FIG. 5 is a representative, fragmentary, partly broken away view, taken generally in the direction of the arrows 5-5 of FIG. 4 and is of a greatly simplified and somewhat diagrammatic and schematic type primarily for the purpose of illustrating the operation of the quilting material handling portion of the quilting machine shown in FIG. 1, while the quilting material is, of course, being power-sewed in a desired preprogrammed manner by multiple power-reciprocatable needle means—not shown since such are well known, but understood to be positioned immediately above the central portion of the apparatus as shown in FIG. 5—with said power sewing to be caused to follow a desired, preprogrammed pattern on the quilting material, represented diagrammatically by the thin strip arrow shown in FIG. 5 (although, of course, it should be understood that the quilting material normally extends substantially the breadth of the machine) in a manner determined by the record strip means on the movement-instruction-record means (carried by the movement-instruction-record mounting means shown in FIG. 1 and shown drawn to a larger scale in FIG. 4), and by the sensing of the information carried thereby by the movement-instruction-sensing means which is shown in FIG. 4 and shown more clearly, although fragmentarily, in FIGS. 6—10 inclusive.

FIG. 6 is a fragmentary, partly broken away, sectional view, taken substantially along the plane and in the direction indicated by the arrows 6–6 of FIG. 4, and shows certain portions of the movement-instruction-sensing means and the two servomotor control means operated thereby.

FIG. 7 is a greatly enlarged, fragmentary view taken substantially in the direction of the arrows 7–7 of FIG. 6 and most clearly shows one representative form of the output operating control portion of the movement-instruction-sensing means and the two input portions of the first and second control means (best shown in FIG. 6) controlling the operation of the first and second servomotor means.

Figure 4:
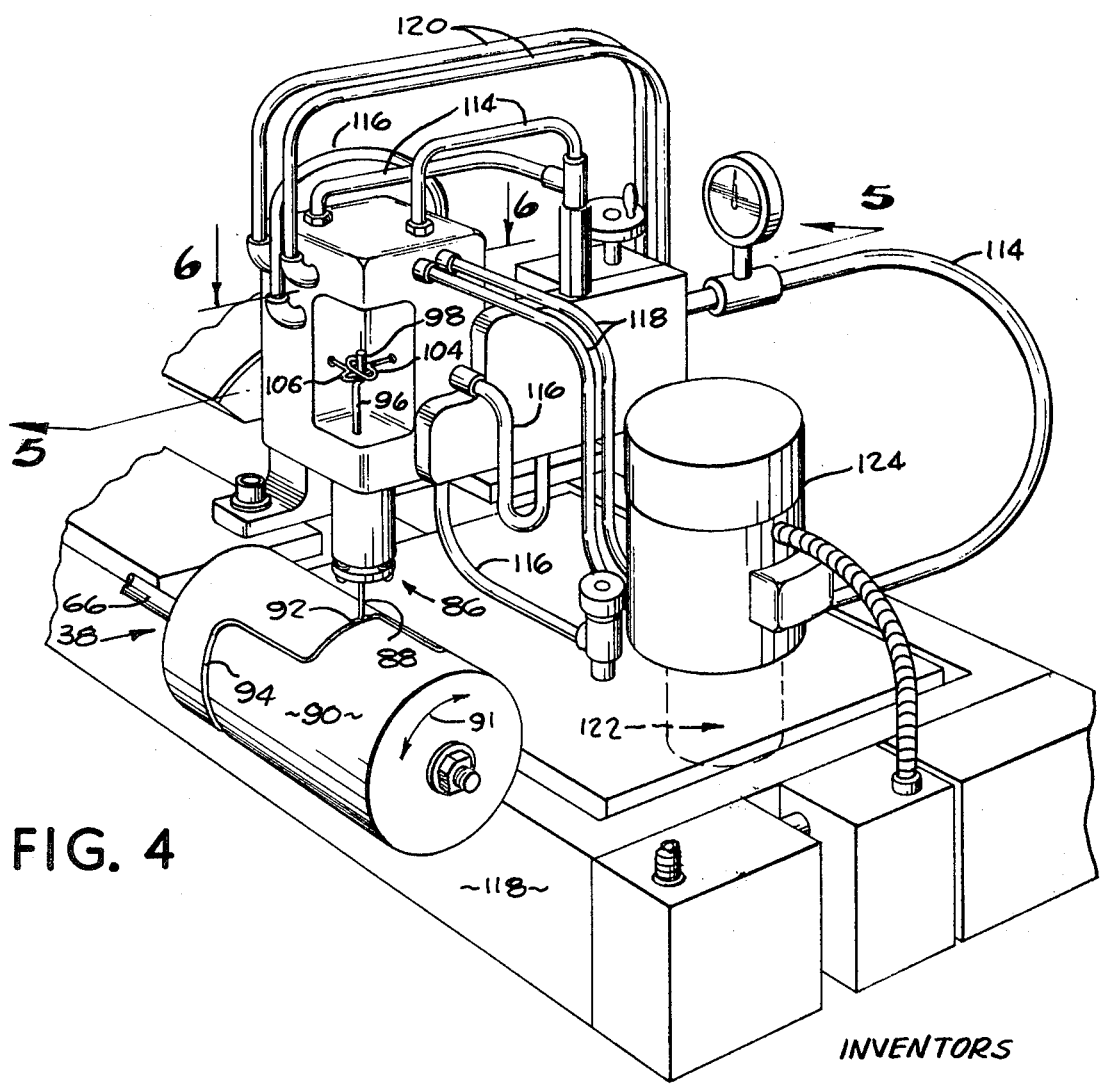

FIG. 8 is an enlarged, fragmentary, partly broken away, greatly simplified, perspective view, of a substantially diagrammatic and schematic nature, corresponding substantially in aspect to FIG. 4 but more clearly showing the relationship of the various elements of the complete servo apparatus, movement-instruction-sensing means, movement-instruction-record means, and mounting means therefor, of the exemplary form of the present invention illustrated, including a diagrammatic indication of the two different directions of output movement produced by the two different servomotor means.

FIG. 9 is a fragmentary, partially broken away, sectional view, taken substantially along the plane and in the direction indicated by the arrows 9–9 of FIG. 6, and most clearly shows the detailed structure of the exemplary form of movement-instruction-sensing means illustrated. However, it should be noted that, in this view, the control valve means operated by the movement-instruction-sensing means is shown rotated 90° from its true position as shown in FIG. 6. This is done for reasons of drawing clarity, but it should be clearly understood that this does not imply that there is an inconsistency in the actual physical position of said control valve means.

FIG. 10 is an enlarged, fragmentary view, taken substantially along the plane and in the direction indicated by the arrows 10–10 of FIG. 8.

FIG. 11 is a fragmentary, perspective view illustrating a modified form of movement-instruction-record means and a modified form of movement-instruction-record mounting means therefor.

Figure 12:
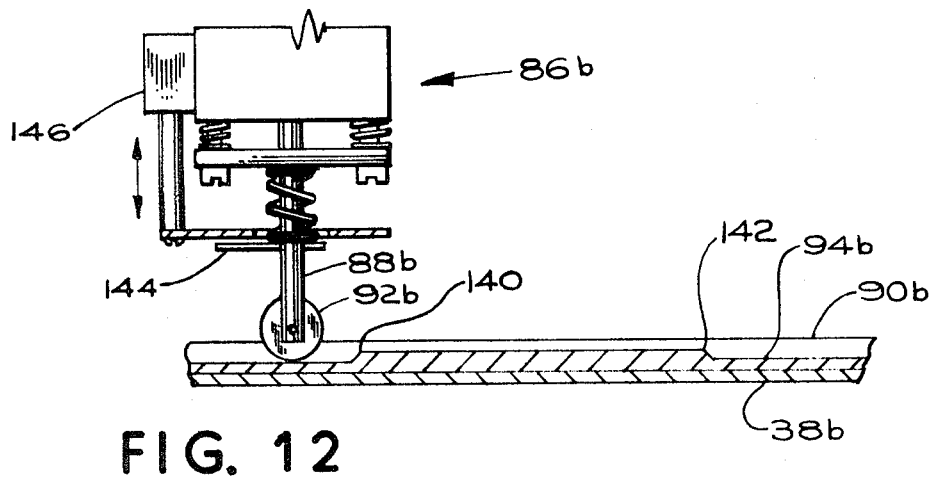

FIG. 12 is a fragmentary view illustrating a slight modification of the movement-instruction-record means and, in particular, of the record strip groove means thereof and of the record sensing, perceiving and reading means cooperable therewith and which makes it possible to controllably inactivate the power head unit or plurality of power head units controlled by the apparatus for desired record strip length durations.

Figure 13:
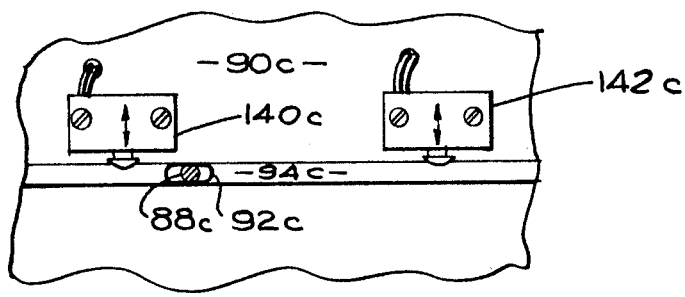

FIG. 13 is a view similar to FIG. 12 in certain respects and illustrates a further modification of the same portions of the apparatus for the same general purpose, differently achieved, however.

Figure 14:
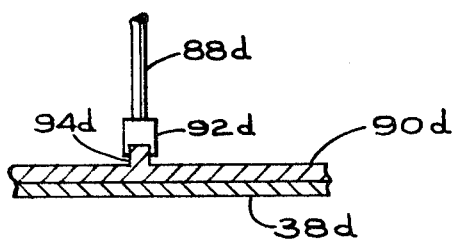

FIG. 14 is a greatly enlarged fragmentary view illustrating a modified type of record strip means and a corresponding modified type of following head means.

Figure 1A:
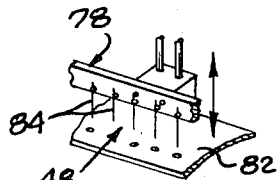
Figure 1:
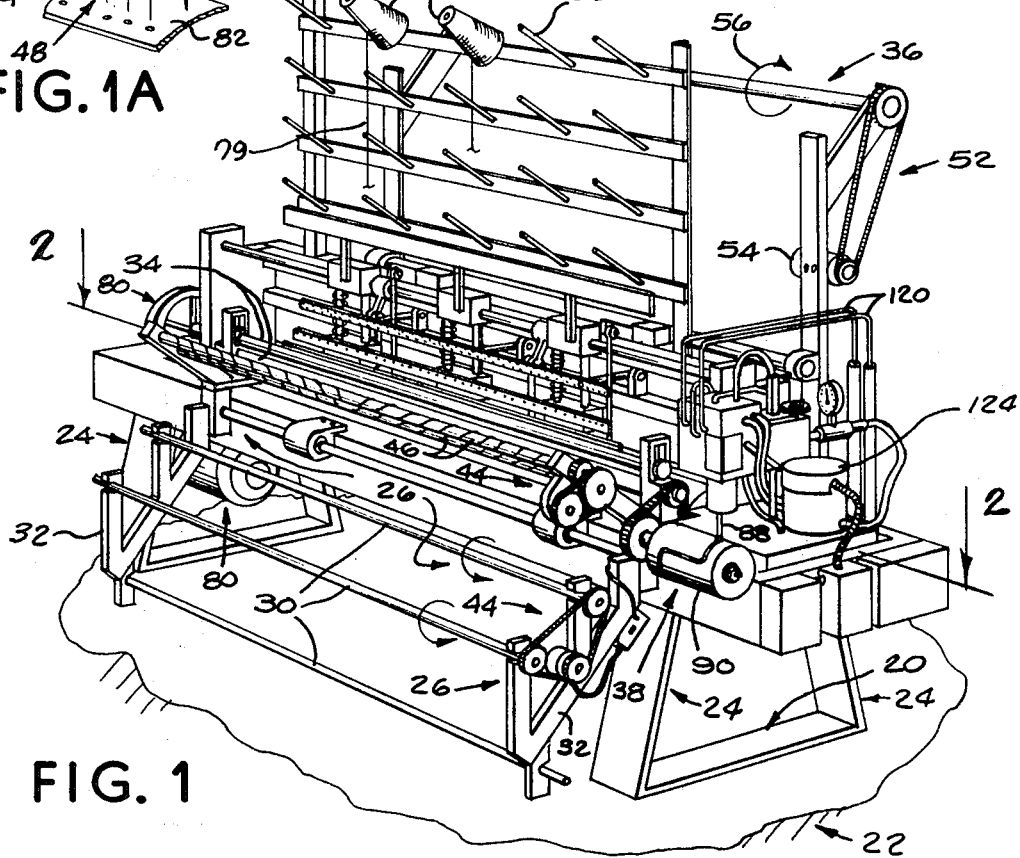

It should be noted that in certain of the figures such as in FIGS. 4, 6 and 8, a removable cover normally covering the operating output portion of the record sensing, perceiving, and reading means and the two input portions of the two control means is shown removed for reasons of drawing clarity, while in FIG. 1 said portion of the movement-instruction-sensing means is shown enclosed by said removable cover portion.

One exemplary embodiment of the present invention is illustrated in FIGS. 1—10 wherein the servo apparatus, the movement-instruction-sensing, the movement-instruction-record means, and the mounting means therefor are shown as comprising a part of a complete multiple-needle power sewing machine or apparatus intended primarily, in the example illustrated, for use as a quilting machine, for power-sewing desired patterns on quilting material (usually comprising a laminated structure made up of several layers of fabric and padding material, although not specifically so limited). However, it should be clearly noted that the quilting machine embodiment of the invention is merely exemplary of the many possible forms and applications of the apparatus of the present invention which lie within the broad scope thereof and all of which are intended to be included and comprehended within the broad scope of the present invention. Indeed, wherever a preprogrammed type of movement (including multiple different movements of various different numbers, magnitudes, and/or directions) is to be produced for the purpose of effecting a desired type of movement of one or more auxiliary objects, the apparatus of the present invention may be employed directly for such purposes or modified or adapted for such purposes, and all such arrangements are intended to be included and comprehended within the broad scope of the present invention.

In other words, the quilting machine illustrated in FIGS. 1—10 is merely representative of the many possible forms of the invention and is not intended to in any way limit the invention specifically thereto.

In the exemplary quilting machine embodiment of the invention, it will be noted that there is a supporting base, indicated at 20, which is adapted to rest upon an underlying horizontal supporting surface, such as that indicated fragmentarily at 22 in FIG. 1, for the purpose of supporting the entire apparatus. The apparatus proper includes a fixed underlying supporting frame portion, such as is indicated generally at 24, carried by the supporting base 20 and a transversely or laterally slidably shiftable or movable frame, platform, or table portion, indicated generally at 26 (best shown in FIGS. 2, 3 and 5) which mounts and carries what might be generally termed quilting material handling means, such as is generally designated by the reference numeral 28, as best shown in FIG. 5. Said handling means 28 includes a plurality (three in the example illustrated) of thin-sheet or quilting material supply reel (mandrel) means indicated at 30 carried by a front depending framework portion 32, quilting material feeding and intermediate positioning means, indicated generally by the reference numeral 34 as best shown in FIG. 5, and takeup reel (mandrel) means indicated generally at 36. Also, said transversely slidably movable platform means 26, in the specific example illustrated, carries a movement-instruction-record mounting means, such as is generally designated by the reference numeral 38, which will be described in greater detail hereinafter.

In the example illustrated, the transverse slidable mounting of the platform of table means 26 with respect to the rest of the frame 24 is accomplished by the transverse rods 40 and roller bearing means 42. However, any other suitable type of mounting means for relatively transversely movably mounting the platform or table means 26 with respect to the rest of the frame portion 24 may be employed in lieu thereof, such as casters, "Rolamite" band-type effective bearings, or the like.

In the exemplary first form illustrated, the three quilting material supply reel (mandrel) means indicated generally at 30 are removably mountable with respect to the frame portion 32 and each is adapted to normally have placed thereon a spirally wound roll or reel of material which, together, will form a laminated body of quilting material, when joined in superimposed relationship. Usually the lowermost one of the three reels (mandrels) 30 will carry a roll or reel of fabric material which is to comprise one surface of a laminated body of quilting material, while the top one of the three reels (mandrels) 30 will carry another roll or reel of fabric material intended to comprise the opposite outer surface of the quilting material, while the middle one of the three reels (mandrels) 30 will carry a roll or reel of padding or filler material intended to comprise the intermediate portion of a body of quilting when all three layers thereof are joined together. However, this is merely representative of one preferred arrangement and is not intended to limit the invention specifically thereto.

Where reference has been made hereinabove to the three quilting material supply reel means 30 and to the takeup reel means 36, it should be clearly understood that what is actually shown in the figures of the drawings at each of the indicated locations therefor, is a mandrel means which is adapted to receive thereon a conventional spirally wound roll, reel or bolt of the corresponding quilting material (either the fabric for the top and bottom layers, the padding for the intermediate layer, of the composite laminate thereof comprising the quilting material taken up by the takeup reel or mandrel 36). Therefore, it should be clearly understood that the use of the word "reel" in connection with said structures is essentially interchangeable with the word "shaft" or "mandrel" and is to be broadly so construed.

Incidentally, it should be noted that suitable back-tension-providing means may be employed for maintaining appropriate back tension on any or all of the different layers of quilting material during the feeding thereof through the quilting machine and/or of the composite layer thereof during such feeding operation and, in the exemplary first form of the invention illustrated, such back-tension-providing means is, in part, illustrated at 44 and includes electric motor means, power transmission means, and effective slip clutch means, or equivalent thereof, driving the corresponding mandrel means and/or back-tensioning roller means, indicated by the reference numeral 46, so as to provide appropriate tension on the quilting material during the feeding and power-sewing operation to produce optimum and accurate placement of the sewed patterns on the laminated quilting material when it is in the intermediate sewing region, generally designated by the reference numeral 48 as best shown in FIG. 5. This also prevents any irregular or erratic feeding of the quilting material.

Incidentally, the feeding of the composite three-layer quilting material is illustrated in FIG. 5 by the flat arrowlike structure of thin-sheet material indicated at 50 which is intended to diagrammatically represent a central portion of such a body of quilting material as it passes through the quilting material handling portion 28 of the quilting machine. It of course should be understood that said composite, three-layer quilting material 50 would normally extend substantially the width of the machine but, for purpose of drawing clarity and simplification, the relatively narrow central representative strip thereof shown at 50 is employed in FIG. 5 but should be construed as being of broader generally quiltlike configuration.

The takeup reel or mandrel means indicated at 36 is also provided with drive means adapted to cause driving movement, through suitable slip clutch means (or equivalent), of the takeup mandrel or reel 36 in a forward direction of movement relative to the longitudinal, net forward, through-flow direction of movement of the quilting material 50 through the entire quilting material handling means 28, whereas the previously mentioned back-tensioning means indicated at 44 and 46 are driven with a controllably effective slip clutch-overridable reverse torque in the opposite direction for the back-tensioning purposes previously described. In the case of the takeup mandrel or reel means 36, the just-mentioned drive means therefor is indicated generally at 52 and comprises power transmission means connecting a takeup motor 54 (usually electrically operable, although not so limited), through suitable overridable effective slip clutch means, with respect to the takeup mandrel, shaft, or reel means, indicated generally at 36, in a manner such as to normally tend to forwardly drive same in the direction of the arrow 56 best shown in FIG. 1.

In addition to the takeup mandrel or reel means 36, the power transmission means 52, and the takeup motor 54, there is an additional reversible motor having an output portion producing effective forward (or temporary reverse) movement of the quilting material 50 in the directions of the directional arrow 57 as best shown in FIGS. 5 and 8, and this comprises the main quilting material driving motor means, which is generally designated by the reference numeral 58, as best shown in FIG. 5 and FIG. 8, which may be referred to as a first servomotor means having an output portion, which may be said to comprise the output gear 60, coupled by the power transmission means, indicated generally at 62, as best shown in FIG. 5, to the pairs of spring-biased positioning and feeding rollers 34 on each side of the intermediate sewing region 48 and also coupled to a gear 64 driving shaft 66 which is coupled to the previously mentioned movement-instruction-record mounting means generally designated at 38 and which will be described in greater detail hereinafter.

Thus, when said first servomotor means 58 is operated in its normal net forward-movement-producing direction as indicated by the directional arrow 68 (best shown in FIGS. 5 and 8) the feed rollers 34 positively advance the quilting material 50 at a forward speed which is an exact function of the forward-movement-causing output of the variable-speed first servomotor means 58. Of course, it should be understood that since the first servomotor means 58 is reversible, it may, when called for by the controlling movement-instruction-record means, cause temporary reverse operation of the gear 60, the power transmission means 62, the positioning and feeding rollers 34 and the movement-instruction-record mounting means generally designated at 38. Normally, this reverse output movement of the first servomotor means 58 will be temporary since the net overall movement thereof must be forward of the quilting material is to ultimately pass completely through the quilting machine. However, wherever the desired pattern calls for sewing in a reverse direction on the quilting material 50, the first servomotor means 58 will for a corresponding period of time operate in the reverse direction and will ultimately resume its forward direction so that the quilting material 50 will continue on through the quilting material handling means 28 and will be taken up by the takeup reel or mandrel means 36. During the temporary reverse operation of the first servomotor means 58, the temporary reverse movement of the quilting material 50 is permitted despite the forward movement of the takeup reel or mandrel drive motor 54 by reason of the previously mentioned overridable effective slip clutch interconnection between said takeup motor 54 and the takeup reel or mandrel means 36 driven thereby. Reference will be made to this hereinafter.

Figure 2:
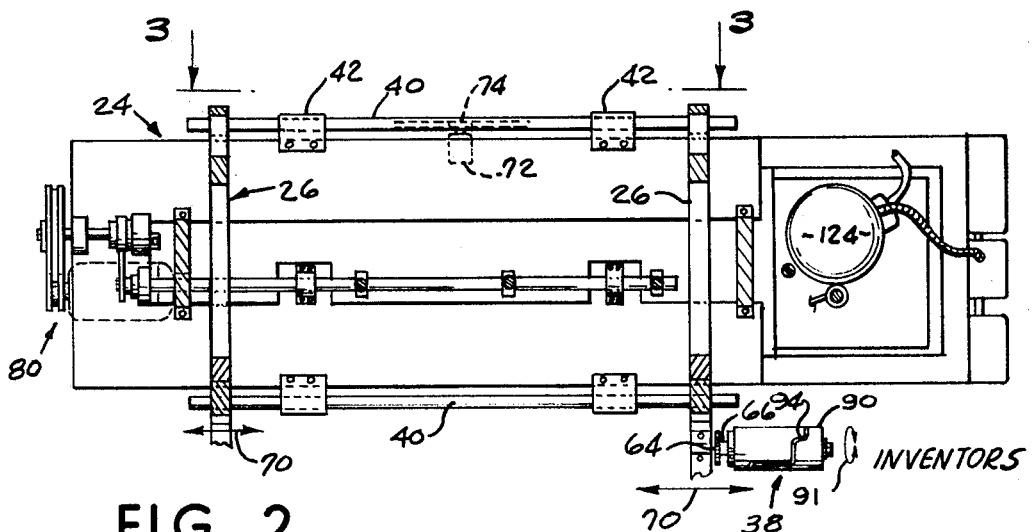
Figure 3:
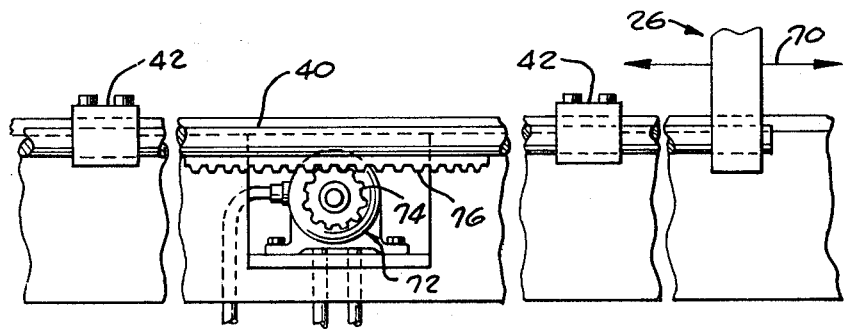

The entire transversely slidably movable platform or table means indicated generally at 26 and best shown in FIG. 5, which is transversely movable as previously mentioned, by reason of the mounting thereof with respect to the fixed frame portion 24 by the rods 40 and slidable bearing means 42, is adapted to be reversibly power-driven in the transverse direction of movement indicated by the double-headed arrows 70, best shown in FIG. 2, by second servomotor means indicated at 72, as best shown in FIG. 3 and FIG. 8, and which has an output portion which may be said to comprise the gear 74 effectively coupled to and adapted to cause transverse movement of the previously mentioned auxiliary object (which in this example comprises the quilting material 50 of FIG. 5). However, in this case, this is accomplished through an intermediary auxiliary transverse object comprising the previously mentioned table or platform 26 which is coupled to the gear 74 of the second servomotor means 72 by the longitudinal toothed rack 76 so that operation of the reversible second servomotor means 72 will cause corresponding transverse movement of the entire platform or table 26 and the complete quilting material handling means, indicated generally at 28, as best shown in FIG. 5, and of course, also, of the quilting material 50, while a power head or unit comprising a bank of power-reciprocatable needle means such as indicated in fragmentary, broken-away, somewhat diagrammatic and schematic form at 78 in FIG. 1A, and which is not transversely movable along with the platform or table means 26, is vertically reciprocated by appropriate transmission means coupling the power-sewing main drive means indicated at 80 in FIGS. 1 and 2 to the multiple-needle head 78. This will cause a pattern of sewing to be formed on the quilting material 50 as it passes through the sewing region 48 immediately over the fixed sewing needle receiving panel, indicated generally at 82, as best shown in FIG. 5, which is provided with appropriate bobbin means and conventional sewing mechanism means, not shown in detail since such is well known in the art and does not touch upon the real inventive concept of the present invention. In other words, variation in the rate of longitudinal movement of the quilting material 50 through the intermediate sewing region 48 as a consequence of variation in the output of the first servomotor means 58, will cause corresponding longitudinal sewing pattern variations to be formed on the quilting material 50 by the reciprocating sewing needles 84 of the sewing-needle head 78, while transverse movement of the quilting material 50 relative to the sewing needles of the sewing-needle head 78 as a result of variable output of the second servomotor means 72 will cause transverse sewing pattern variations to be formed on the quilting material 50 as it passes through the sewing region 48. Thus, it is clear that controlling the output of the first and second servomotors 58 and 72 will exactly control the longitudinal and transverse orientation of the sewing pattern produced on the quilting material 50 by each of the multiple power-reciprocatable needles 84 of the needle-carrying reciprocatable power head means 78. Of course, each of the needles 84 is adapted to be supplied with thread means from spool supply means such as the representative threads 79 carried by the representative spools 81 mounted on a representative pair of the spool-mounting spindles 83. The details of this, as well as the reciprocating coupling of the main drive means 80 to the power head 78, are not shown since such are well known in the art and do not touch upon the inventive concept of the present invention.

The present invention includes means for controlling the above-mentioned first and second servomotor means 58 and 72 in a desired preprogrammed manner, and said means includes movement-instruction-sensing means, such as generally designated by the reference numeral 86 as best shown in FIGS. 4, 6, and 8, which includes as parts thereof a record sensing, perceiving and reading means, such as generally designated by the reference numeral 88, which is cooperable with a movement-instruction-record means, such as is designated by the reference numeral 90 in one exemplary form, which is adapted to be mounted on the previously mentioned mounting means, indicated generally at 38, which is rotatably driven by the previously mentioned shaft 66 driven by the power transmission means 62 and the first servomotor means 58, all of which are best shown in FIG. 5. Thus, it is clear that the movement-instruction-record means 90 is rotated in either direction, such as indicated by the directional arrow 91, as best shown in FIG. 8, which corresponds to the longitudinal movement-producing directional output arrow 57 of the first servomotor means 58 and to longitudinal movement of the quilting material 50 through the entire quilting material handling means, indicated generally at 28 as best shown in FIG. 5, and that the speed of such rotative movement of the record means 90 will correspond to the speed of longitudinal movement of the quilting material 50 since the coupling by the power transmission means 62 of the output portion 60 of the variable speed first servomotor means 58 to the record mounting means 38 may in a sense be said to comprise feedback means insofar as said longitudinal directional movement is concerned.

Of course, as previously mentioned, the movement-instruction-record mounting means, indicated generally at 38, is effectively carried by, and is movable with, the previously described entire laterally or transversely slidably movable platform or table means, indicated generally at 26 (best shown in FIG. 5) and therefore is also simultaneously movable in said lateral direction (although in certain modifications it may be so coupled as to move oppositely) in correspondence with the lateral movement of the quilting material 50, and this coupling may be said to comprise effective feedback means from the previously described reversible second servo means 72 to the record mounting means 38 and the record means 90 of the movement-instruction-sensing means indicated generally at 86. However, it should be clearly understood that the record sensing, perceiving and reading stylus means 88 of the movement-instruction-sensing means 86 is not effectively carried by said panel or table 26 and therefore is not transversely shifted along with the transverse shifting of the quilting material 50 in response to operation in either direction of the reversible second servomotor means 72. Also, said record sensing, perceiving and reading stylus means 88 is not longitudinally movable in correspondence with the variable output of the previously mentioned first servomotor means 58 and the corresponding longitudinal movement variations effectively transmitted therefrom to the quilting material 50. Thus, it will be understood that the rotation of the record mounting means 38 as indicated by the directional arrow 91 which corresponds with the longitudinal movement of the quilting material 50 produced by a corresponding variation in the output of the first servomotor means 58 causes corresponding effective longitudinal movement of the projected surface of the movement-instruction-record means 90 to occur relative to the fixed following head means 92 of the record sensing, perceiving and reading stylus means 88, while transverse shifting movement of the platform or table 26, and correspondingly of the quilting material 50 produced as a result of corresponding variations in the output (indicated by the directional arrow 57) of the second servomotor means 72 will cause corresponding transverse shifting of the entire record mounting means 38 and consequently of the surface of the record 90 relative to the following head means 92 of the record sensing, perceiving and reading stylus means 88 to occur.

Since the record means 90 carries along the longitudinal length of the projected plan view surface thereof, what might be termed a record strip, such as indicated at 94, and which in the exemplary first form of the invention illustrated is a recessed groove in the surface of the record 90, the following head means 92 which is of nonround shape and which is inserted into the record strip groove 94 in a manner such as to be incapable of angular rotation relative to the groove, will essentially follow the groove direction and orientation as the record 90 moves longitudinally and/or laterally under and relative to the following head means 92, which remains substantially fixed in a translator sense but which will have its angular orientation around the vertical axis of the vertical shaft or connecting rod portion 96 of the record sensing, perceiving and reading stylus means 88 changed in a manner which will correspondingly cause rotation of an output control operating portion 98 thereof around said vertical axis of the shaft or connecting rod portion 96 thereof. In the exemplary first form of the invention illustrated, said output control operating portion 98 is offset with respect to the connecting rod portion 96 and the axis of rotation thereof, and thus effectively comprises an offset crank portion, so that there will be actual arcuate movement of said output control operating portion 98 in response to angular displacement of the following head means 92 caused by corresponding changes in angular direction and orientation of the portion of the record strip groove 94 being read by the following head means 92.

Said output control operating portion 98 is coupled to first and second control means, indicated generally at 100 and 102, respectively, by corresponding input portions 104 and 106, respectively, in a manner such that angular displacement of the following head means 92 will cause corresponding operation of either or both of said input portions 104 and 106 by reason of the engagement therewith and movement thereof by said output control operating crank portion 98, which will, of course, cause the input portions 104 and 106 (which, in the exemplary first form of the invention illustrated, take the representative form a pair of effectively perpendicularly related slotted engagement members receiving the crank portion 98 therein) to transmit translatory movement through the corresponding connecting rod portions 108 and 110, respectively, to the previously mentioned first and second control means 100 and 102, respectively, and in exact correspondence with the angular displacement of the following head means 92 as determined by the corresponding angular direction and orientation of the read portion of the record strip groove 94.

The movement of the two different control means' connecting rods 108 and/or 110 in correspondence with the movement-instruction information carried by the record strip 94 and read by the following head means 92, causes said first and second control means 100 and 102 to correspondingly control the operation and the output of the previously mentioned first and second servomotor means 58 and 72 whereby to cause corresponding variations in the longitudinal movement of the auxiliary object comprising the quilting material 50 and corresponding transverse movement of the entire platform 26 and the quilting material 50 carried thereby which, as previously mentioned, will cause the nonlongitudinally moving and nonlaterally moving but vertically reciprocating power-needle-carrying head means 78 to produce exactly corresponding sewed patterns on the composite quilting material 50 as it passes through the previously mentioned sewing region 48 overlying the fixed needle-receiving panel 82 and carrying the conventional bobbins and the conventional remainder of the sewing mechanism.

In the exemplary first form of the invention illustrated, the following head means 92 may be of any nonround effective groove-following configuration, but as illustrated, it is of elongated shape adapted to ride in the record strip groove 94 in a manner which constrains the following head means 92 to assume exactly the same angular direction and orientation as the particular read portion of the record strip groove 94. This is one exemplary configuration of the following head means 92, but is not intended to specifically limit the invention thereto. This statement is also true with respect to the output control operating crank portion 98, which is one simple and effective construction. However, the invention should be clearly understood to not be specifically so limited. This is also true relative to the pair of mutually perpendicular slotted input portions 104 and 106 which provide a convenient type of coupling input portion but which are merely representative of a variety of other forms which such input portions may assume within the broad scope of the present invention.

In the example illustrated, the above-mentioned first and second control means 100 and 102 take the form of fluid valve means of an effective two-way or four-port type appropriately connected to a pressurized fluid input line 114 and to a return line 116 returning to the sump or reservoir means 117. The arrangement is such that when the connecting rods 108 and/or 110 are shifted, the high pressure fluid is connected through the corresponding control means valves 100 and/or 102, respectively, to a corresponding side of the first and/or second servomotor means 58 and 72, while the opposite side of either or both of said servomotors 58 and 72 is effectively connected to the low pressure return line of the fluid system, respectively, for driving same in a corresponding direction and at a rate depending upon the extent of opening of the corresponding control valve means 100 and/or 102, respectively. Reverse effective movement of either of the connecting rods 108 and/or 110 reverses the connection of the high pressure fluid and low pressure fluid lines relative to the corresponding first and/or second servomotor means 58 and 72, respectively, so as to cause whichever of said motors has had its connecting rod 108 or 110 moved in reverse, to effectively modify and/or reverse the output movement produced by said servomotor means.

The above-described controllable and reversible mode of operation is made possible by the structure previously described plus the pair of fluid lines 118 connected between the first control valve means 100 and the first servomotor means 58 and a similar pair of fluid lines 120 connected between the second control valve means 102 and the second servomotor means 72.

While the first and second servomotor means 58 and 72, the corresponding first and second control valve means 100 and 102, the fluid pump means 122 and the electrically energizable driving motor 124 therefor provide a convenient and easy-to-operate system, it should be clearly noted that this system is merely representative of many different forms which the invention may assume with respect to servomotors and control means therefor and is not to be construed in a specifically limiting manner. For example, the motors may be electrical and the control means may be electrical. Numerous substantially functionally equivalent arrangements lie within the broad scope of the present invention.

It should be clearly noted that the exemplary movement-instruction-record means 90 is preferably of a removably mountable type relative to the movement-instruction-record mounting means 38 and this may be done in any of a variety of manners and may involve any of a variety of different structures, such as a sleevelike arrangement wherein the record is merely axially slidably moved into position on a mounting drum, or is of a type adapted to be wrapped around a mounting drum and end-to-end fastened in place or mounted in any other appropriate manner thereon so that different movement-instruction-record means bearing different preprogrammed movement-instruction information thereon in differently positioned and oriented record strips 94 may be quickly and easily interchanged for producing a variety of different corresponding patterns on the quilting material 50.

It should also be noted that the record means may be of a different configuration, as represented in one exemplary form in FIG. 11, and may be correspondingly differently mounted as will be described hereinafter.

It should be noted that since the exemplary, but nonspecifically limiting, arrangement effectively provides feedback to the movement-instruction-sensing means indicated generally at 86, by reason of the coupling of the record mounting means 38 to the first servomotor means 58 for movement in correspondence therewith and by reason of the mounting of the entire record mounting means 38 for transverse movement in correspondence with the transverse movement of the supporting platform or table 26 and the quilting material 50 carried thereby, the net effect of said two movements will be to vectorially combine same and this, of course, results in a repositioning of the record strip groove 94 relative to the following head means 92 which should fully correspond to each other. However, in the event that there is some slight discrepancy, such as might be provided by a malfunction in one of the control unit valve means 100 and 102 or in the corresponding servomotor means 58 and 72 or in connecting portions of the fluid circuit means, so that the vectorial combination of transverse and longitudinal movement of the quilting material and correspondingly of the record means 90 relative to the following head means 92 does not correspond to the angular direction, position, and orientation of the portion of the record strip groove 94 being read at that instant by the following head means 92, there would be an extraneous and undesired force applied to the following head means 92 by reason of said error or discrepancy. This is fully compensated for in the mounting arrangement for the connecting rod 96 of the record sensing, perceiving and reading stylus means 88 by reason of its mounting in the resiliently displaceable bearing cylinder, indicated generally at 126 as best shown in FIG. 9, which includes an upper and lower rotary bearing means 128 and 130 mounting the connecting rod 96 in a freely rotative manner but in a longitudinally substantially nondisplaceable manner; said bearing cylinder 126 being coupled by way of the spring means 132 relative to the fixed housing portion 134 in a manner which will allow a slight rocking movement of the entire resiliently displaceable bearing cylinder 126 to occur into a representative displaced position, such as is illustrated in phantom lines in FIG. 9, whenever such a vectorial discrepancy occurs. It should be noted that this displacement causes movement of the operating crank portion 98 to occur in a manner such as to tend to correct the discrepancy. It should be noted that the condition described above is particularly well illustrated in FIG. 9 in phantom lines since in this figure the following head means 92 is moving in the record strip groove 94 in a substantially longitudinal direction relative to the rotating record means 90 (although actually the following head means 92 is of course stationary with respect to a fixed reference such as the fixed frame portion 24 of the entire apparatus). Under these conditions, if there should be some malfunction of the control valve means 102 and the corresponding reversible lateral-movement-causing servomotor means 72, or any of the interconnecting ducting so that there is a net lateral shifting of the platform or table 26, the quilting material 50 and, of course, the record mounting means 38 and the record means 90—let us say toward the left as viewed in FIG. 9—which is actually caused by said malfunction of the fluid motor controlling and operating system, the arrangement of the interior valving structure of the control valve means 102 is so arranged that the effective slight lateral shifting of the following head means 92 toward the left as viewed in FIG. 9 and as shown in phantom lines therein and caused by such malfunction or error in the operation of the system will effectively rock the resiliently displaceable bearing cylinder indicated generally at 126 slightly toward the right or in a clockwise direction as viewed in FIG. 9 into a position such as is shown in phantom lines in FIG. 9 which causes a slight rightward movement of the upper operating crank portion 98 to occur and a corresponding rightward movement of the connecting rod 110 to occur which operates the interior valving structure of the second control valve means 102 in a manner such as to modify the flow of pressurized fluid through the two ducts 120 going to the transverse reversible servomotor means 72 in a manner which causes the output thereof to be modified in a direction such as to move the entire platform or table 26 toward right as viewed in FIG. 9 in a manner such as to fully correct the above-mentioned error and cause the connecting rod 96 to straighten up and the resiliently displaceable bearing cylinder 126 to similarly straighten up and return to its normal position. This slight corrective rightward movement of the record means 90 and of the supporting platform or table 26 of course correspondingly causes corrective slight rightward movement of the quilting material 50 and functions to fully correct the above-mentioned type of error, malfunction or discrepancy. However, other means for doing so within the broad scope and teachings of the present invention are intended to be included and comprehended herein.

FIG. 11 fragmentarily illustrates a modified type of movement-instruction-record means, and mounting means therefore, adapted to replace that shown in the first form of the invention at 90 and 38, respectively. Because this view does illustrate a modification, parts which are structurally or functionally substantially identical, similar, or equivalent to corresponding parts of the first form of the invention are designated by similar reference numerals, followed by the letter a, however. It will be noted that in the FIG. 11 modification, the movement-instruction-record means, which is indicated generally by the reference numeral 90a, is of a modified form wherein it, in effect, comprises a continuous loop or length of belt material taking the form of a plurality of effectively, hingedly, or pivotally interconnected end-to-end-positioned panels such as illustrated at 136 provided on an accessible outer surface 138 thereof with a continuous length of record strip groove means 94a arranged to be effectively interconnected along the flat top assembly region thereof shown in FIG. 11 where a following head means, such as shown at 92 in FIG. 8, would engage the record strip groove 94a. It will be noted that the entire multipanel belt comprising the record means 90a in the modified FIG. 11 form thereof is arranged to be easily removed from the modified mounting means indicated generally at 38a for replacement by a different record means when desired.

FIG. 12 is a fragmentary, enlarged, sectional view illustrating a portion of a further-modified record groove, which in this case is indicated by the reference numeral 94b. Indeed, all parts of this modification similar to previously described parts of the invention are designated by similar reference numerals, followed by the letter b, however. In this modification, it will be noted that the record groove or strip 94b is effectively interrupted in one sense by the provision of interruption means positioned at pint 140 and point 142, respectively, which, in the example, merely comprises a slight raising of the bottom of the groove 94b, which will, of course, correspondingly move the following head means 92b so that a switch-operating portion 144 thereof may effectively operate a switch means 146 in a direction such as to cause the intermittent cessation of operation of the needle-carrying power sewing head means such as that shown at 78 in FIG. 1A, for example, and not again repeated in this view. In other words, when the point 140 is reached in the record groove, the interrupting means at point 140 will cause a cessation of the sewing pattern on the quilting material, such as that shown at 50 in FIG. 5 of the first form of the invention, to occur, and this cessation will continue until the second interruption means at point 142 is reached by the following head means 92b, at which time the switch 146 will be effectively oppositely operated and cause the needle-carrying power sewing head means to resume its normal reciprocating sewing operation whereby to cause a resumption of the sewed pattern on the quilting material to occur. This particular modification of the invention, while applicable to the quilting machine as mentioned above, is even more applicable to various other forms of the invention wherein the servo apparatus, movement-instruction sensing means and movement-instruction record means therefor are employed for controlling different types of machines, such as a multiple drilling machine, routing machine, boring machine, milling machine, press, or punching machine, or the like, for causing corresponding cutting, punching, or other piercing and/or forming operations to occur with respect to different type of auxiliary object, such as a metal or plastic blank, or the like, rather than a piece of quilting material. The intermittent operation permitted by the FIG. 12 modification of the invention would thus make it possible to intermittently drill or punch holes in such a blank of material without having a continuous interconnected groove, slot or cut produced therein and the FIG. 12 modification of the invention is particularly adapted for such usage, although not specifically limited thereto.

FIG. 13 is a fragmentary view illustrating a further modification of the FIG. 12 version of the invention, and because it is a modification, parts which are structurally or functionally substantially identical, similar, or equivalent to those of the FIG. 12, modification are designated by similar reference numerals, followed by the letter c, however. In this modification, it will be noted that the record groove 94c has the interruption means 140c and 142c taking the form of the two switches functionally equivalent to the switch means shown at 146 in FIG. 12 and each positioned in the path of travel of a corresponding switch-operating portion of the following head means 92c for corresponding on and off switching operation thereby as the following head means 92c passes along the corresponding length of record groove 94c. This will result in substantially the same type of interrupted operation of the power unit, corresponding to the power sewing unit 78 of the first form of the invention, or any other type of power unit, a few of which have been referred to hereinabove in connection with the FIG. 12 modification of the invention.

FIG. 14 is a fragmentary view illustrating a further modification of the record strip means the following head means and, therefore, similar parts are designated by similar reference numerals, followed by the letter d, however. In this modification, the record strip 94d is not recessed or in intaglio but is in projecting surface relief—in other words, comprises a ridge projecting above the remaining portion of the surface of the record and, consequently, the following head means 92d comprises an effectively slotted receiver adapted to be engaged upon and to ride along the ridge or groove comprising the record strip 94d.

The present invention is of broad scope and magnitude and, therefore, it should be clearly noted that numerous modifications of the representative but nonspecifically limiting structure illustrated in the various embodiments shown in the figures of the drawing lie within the broad confines of the basic inventive disclosure of the present invention and are intended to be included and comprehended herein as fully as if specifically illustrated and described in detail, which is not done only because of the great length of the application which would result therefrom. For example it should be clearly noted that the relative movement of the workpiece or auxiliary object (in the exemplary first form of the invention illustrated comprising the quilting material although not specifically so limited) with respect to the power unit (which in the exemplary first form of the invention illustrated comprises the power sewing head or unit indicated at 78 although not specifically so limited) is shown as being provided by causing variations in the longitudinal and transverse movement of the auxiliary object (quilting material 50) relative to the nonlongitudinally moving and nonlaterally moving power head (comprising the sewing unit 78 in the example illustrated), but that this is merely one representative means for achieving the desired pattern on the workpiece. The same type of pattern could be achieved by causing the output movement produced by the first and second servomotor means 58 and 72 to be correspondingly applied to the longitudinal and transverse positioning of the power unit (comprising the multiple needle sewing head 78 in the exemplary form of the invention illustrated) and all such modifications are intended to be included and comprehended herein. Also it should be noted that, in certain forms of the invention, the feedback connection between the outputs of either or both of the first and second servomotor means and the movement-instruction-sensing means including the record means may be modified or eliminated and a nonclosed loop type of one-to-one correspondence control of the servomotor means relied upon and all such modifications are intended to be included within the scope hereof. Additionally it should be noted that it is possible to provide the movement-instruction-record means with multiple record strips to be simultaneously followed by multiple following head means for controlling multiple individually movably mounted power head units (in the example illustrated by individually mounting various of the individual sewing needles or subassemblies thereof for separate movement from other such sewing needle mounting assemblies, each under the control of a corresponding individual servomotor means for the transverse direction of control movement thereof while maintaining a common but variable longitudinal movement of the supporting table 26 and quilting material 50). This would make it possible to produce in one pass of the quilting material through the machine a variety of different sewed patterns along the length of the quilted material rather than a plurality of similar sewed patterns. It is also possible in a similar arrangement to have a plurality of longitudinal movement producing independent servomotor means each corresponding to that shown at 58 of the first form of the invention, causing corresponding and differential longitudinal movement of the power unit individual assemblies (such as individual needle mOunting assemblies) in correspondence with the reading of a corresponding one of a plurality of individual following head means each reading an individual record means on an individual record mounting means. This would make possible control in either the longitudinal or the transverse direction or in both directions of each individual needle (or other power unit) so that a great variety of multiple patterns (sewed patterns in the case of a quilting machine or the like) could be produced on the quilting material 50 during a single pass of the quilting material through the machine. All such arrangements lie within the broad scope and teachings of the present invention and are intended to be included and comprehended herein, as are other variations relative to the structures and cooperative relationships between the record strip means and the following head means.

It should be noted that the following head means 92 and record strip groove means 94 illustrated in the exemplary first form of the invention is not capable of making a direct zero radius turn in relative movement as the record means 90 rotates relative to the following head means 92. This is largely so because of the nonround shape of the following head means 92 which is provided so that it will definitely assume and follow the direction and angular orientation of the record strip groove means 94 and thus provide a corresponding angular rotative displacement of the output crank portion 98. However, it is possible to slightly modify the apparatus in a manner such as to make such a zero radius effective change in angular direction of the relative movement of the record strip groove means 94 with respect to the following head means 92 easily attainable by merely providing on the record means 90 an effective small circular rotatable platform portion bearing a portion of the record strip groove 94 just sufficient to receive the full length of the following head means 92 therein and by further providing effective motor means for rotating said small platform portion of the record means 90 through the desired zero radius angular deviation as a result of initiation of operation of the motor by an operating portion, cam means and/or switch means appropriately positioned at the portion of said record strip groove 94 at the input and/or output sides of said small rotary platform means in a manner very similar to the positioning of the cam portions 140 and 142, and the operation of the operating switch means 146 by the switch operating portion 144 as shown in FIG. 12 and/or by operation of the switch means such as shown in the FIG. 13 modification of the invention at 140c and 142c, or by the use of any other substantial structural or functional equivalents. In such a modification, the following head means 92 would relatively move with respect to the record strip groove 94 carried by the rotating record means 90 until the record strip groove portion carried by such a small rotary platform is reached and the entire following head means 92 lies entirely in that portion of the record strip groove 94 carried by said small rotating platform portion. At this time operating means, cam means and switch means such as referred to briefly above by reference to FIGS. 12 and 13 will effectively energize a small motor which will rotate the platform portion, the portion of the record strip groove carried thereby and the following head means 92 through a zero radius rotary movement into a new angular configuration aligned with a new angularly directed portion of the record strip groove 94 fixedly carried by the record means 90 in a conventional manner similar to the portion thereof on the input side of the small rotary platform. If desired additional switch means and switch operating means may be provided and arranged to be actuated as soon as the following head means 92 has passed out of the portion of the record strip groove 94 carried by such a small rotary platform portion and into the adjacent aligned normal record strip groove portion so that the small rotary platform will be returned to its former position for its next subsequent usage, or this may be automatically accomplished by limit switch means. Appropriate stop or limit means may be provided for determining the extent of angular rotation of the platform for the purposes outlined herein. Such a modified arrangement and any other substantially similar structural or functional equivalents thereof are also intended to be included and comprehended within the broad scope of the present invention and to be effectively disclosed herein to a degree such as to fully support the later filing of a copending divisional or continuation-in-part patent application more specifically and particularly directed to this particular aspect of the invention.

It should be noted that a major advantage of the present invention, in the first preferred exemplary form illustrated, is the fact that there is no "dead" point or "null" point in the operation of the servo apparatus and the movement-instruction-sensing means controlling same, as has frequently been the case in the cast where servosystems or partially manually operated and partially servo-operated systems have been employed. In other words, the servosystem of the present invention, in said exemplary preferred form, is completely automatic and one or the other of the two servomotors is operating at all times when the system is handling a quantity of quilting material. Also, no automatic transverse sweep mechanism or advancing mechanism in a direction transverse to the sweep direction is required, as has been necessary in prior-art servosystems intended for generally similar purposes. These advantages of the preferred exemplary first form of the invention illustrated arise primarily from the perpendicular relationship of the two different input means or portions coupled to an the angularly displaceable output portion of the movement-instruction-sensing means and of the operation of the entire movement-instruction-sensing means by angular displacement of the following head means thereof. This avoids the prior art difficulties and problems mentioned above and any possibility of the system's ceasing to operate by reaching a "dead" point or "null" point in the operation of the system and also completely eliminates the necessity of having an automatic sweep means and transverse advancing means to produce an effective area-scanning pattern which merely unnecessarily complicates such a system. All of these advantages inherent in the novel scanning system of the present invention arise primarily from the novel features pointed out hereinbefore, and will be just as useful, effective, and advantageous when employed in record following and servosystems intended to control the operation of various other types of power units.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

What we claim is:

1. Servo apparatus for producing movement as a function of movement-instruction-sensing means coupled thereto and cooperable with respect to a movement-instruction-record means, comprising: first servomotor means having an output portion adapted to be effectively coupled with respect to an auxiliary object for causing corresponding movement thereof of a first type; second servomotor means having an output portion adapted to be effectively coupled with respect to an auxiliary object for causing corresponding movement thereof of a second type; movement-instruction-sensing means including a movement-instruction-record mounting means and a record sensing, perceiving, and reading means cooperable with a movement-instruction-record means when mounted on said mounting means; means for causing relative movement of said movement-instruction-record mounting means and a movement-instruction-record, when mounted thereon, relative to said sensing, perceiving, and reading means whereby to provide a flow of movement-instruction-information to said sensing, perceiving, and reacting means, said sensing, perceiving, and reading means including a record-strip-following head means mounted for following engagement with respect to a record strip of a movement-instruction-record means when movably mounted on said movement-instruction-record mounting means, said following head means being coupled with respect to an output control operating portion; and control means effectively correspondingly coupled with respect to said servomotor means in an output-modifying manner and having input means cooperable with respect to said output control operating portion in two different manners such that movement of said following head means will correspondingly operate said first and/or said second servomotor means in different ways such as to cause said corresponding movement of an auxiliary object, when effectively coupled with respect to said servomotor means, of said first type and/or said second type in correspondence with the preprogrammed movement-instruction information carried by the corresponding portion of a record strip means read by said following head means.

2. Apparatus as defined in claim 1, wherein said output portion of said first servomotor means is adapted to be effectively coupled with respect to an auxiliary object for causing corresponding movement thereof of a first type in a first direction, said output portion of said second servomotor means being adapted to be effectively coupled with respect to an auxiliary object for causing corresponding movement thereof of a second type in a second direction substantially angularly related to the first direction of movement produced by said first servomotor means.

3. Apparatus as defined in claim 1, wherein said output portion of said first servomotor means is adapted to be effectively coupled with respect to an auxiliary object for causing corresponding movement thereof of a first type in a first direction including two oppositely directed senses of said first direction, said output portion of said second servomotor means being adapted to be effectively coupled with respect to an auxiliary object for causing corresponding movement thereof of a second type in a second direction, including two oppositely directed senses of said second direction, substantially perpendicularly related to the two oppositely directed senses of said first direction of movement produced by said first servomotor means.

4. Apparatus as defined in claim 1, wherein said following head means of said sensing, perceiving, and reading means is mounted for angular rotation and displacement according to the angular direction and orientation of a corresponding portion of a record strip means on a movement-instruction record when movably mounted on said movement-instruction-record mounting means.

5. Apparatus as defined in claim 4, wherein said control means comprises first and second control means effectively correspondingly coupled with respect to said first and second servomotor means in an output-modifying manner with respect to each of said servomotor means, said input means being cooperable with respect to said output control operating portion of said movement-instruction-sensing means in two different substantially perpendicularly related manners such that different angular sectors of the complete range of angular movement of said following head means will correspondingly operate different ones of said two control means in a manner such as to cause two differently substantially mutually perpendicularly directed output movements of the two different servomotor means controlled thereby to effectively vectorially combine in the precise manner intended by, and comprising a function of, the angular position, direction, and orientation of a corresponding portion of a record strip means when read by said following head means.

6. Apparatus as defined in claim 5, wherein said input means comprises a pair of effectively substantially perpendicularly related, slotted engagement members and said output control operating portion comprises an offset crank portion passing through both of said substantially perpendicularly related, slotted engagement members whereby rotation of said following head means will cause corresponding rotation of said output crank portion and corresponding actuation of one or the other of said input means connected to said corresponding control means in a manner such that at no relative rotation positionings thereof will both of said control means effectively cause the cessation of output-movement-producing operation of both of said servomotor means.

7. Apparatus as defined in claim 1, wherein said input means comprises a pair of effectively angularly related, slotted engagement members and said output control operating portion comprises an offset crank portion passing through both of said angularly related, slotted engagement members whereby rotation of said following head means will cause corresponding rotation of said output crank portion and corresponding actuation of one or the other of said input means connected to said corresponding control means in a manner such that at no relative rotative positionings thereof will both of said control means effectively cause the cessation of output-movement-producing operation of both of said servomotor means.

8. Apparatus as defined in claim 4, wherein said following head means comprises a nonround record strip engagement portion cooperable with such a record strip means in a particular orientation and after engagement therewith being incapable of changing its relative orientation with respect to such a record strip means and thus being forced to assume an angular orientation corresponding to that displayed by the particular engaged portion of such a record strip means at any given instant.

9. Apparatus as defined in claim 1, wherein said movement-instruction-record mounting means comprises controllably engageable and disengageable record receiving means for removably and interchangeably receiving a movement-instruction record means thereon, and rotary driving means coupled thereto for rotating such a record means mounted thereon in an effective length direction thereof whereby to cause a record strip means portion thereof to be moved with respect to the following head means and to cause an angular positioning thereof corresponding to the followed and read portion of such a record strip means.

10. Apparatus as defined in claim 1, wherein said first and second servomotor means comprise fluid motors having driven output portions and coupling means for coupling each of same with respect to an auxiliary object for causing said corresponding movement of said first and second types thereof.

11. Apparatus as defined in claim 10, wherein said first and second control means comprise fluid multiport valve means connected to corresponding duct means communicating with the corresponding servomotor means for two-direction operational modification thereof, and further comprises input duct means connected to a source of fluid under pressure.

12. Apparatus as defined in claim 1, including effective feedback means for effectively feeding back to said movement-instruction-sensing means information as to the corresponding output movement produced by said servomotor means.

13. Apparatus as defined in claim 12, wherein said feedback means is effectively coupled to said movement-instruction-sensing means by way of said movement-instruction-record mounting means whereby to cause corresponding movement thereof in a manner which is a function of said output movement produced by said servomotor means.

14. Apparatus as defined in claim 1, including effective feedback means effectively coupled between said first and second servomotor means and said movement-instruction-sensing means in a manner for feeding back to said movement-instruction-sensing means information as to the corresponding output movement produced by each of said first and second servomotor means and an auxiliary object effectively coupled with respect thereto and adapted to be correspondingly moved thereby.

15. Apparatus as defined in claim 14, wherein said feedback means is effectively coupled to said movement-instruction-sensing means by way of said movement-instruction-record mounting means whereby to cause corresponding movement thereof in a manner which is a function of said output movement produced by each of said first and second servomotor means.

16. Apparatus as defined in claim 15, wherein said feedback means is effectively coupled between said movement-instruction-sensing means and each of said first and second servomotor means in a negative feedback sense.

17. Apparatus as defined in claim 1, including in combination therewith a movement-instruction-record means comprising means having a length direction adapted to be moved by said movable mounting means therefor in said length direction and being provided thereon with a record strip means therealong adapted to retainingly engage said following head means during and throughout relative movement thereof.

18. Apparatus as defined in claim 17, wherein said record strip means is carried by an outer surface of said movement-instruction-record means in intaglio therealong whereby to retainingly receive said following head means therein and throughout relative movement thereof.

19. Apparatus as defined in claim 17, wherein said record strip means is carried by an outer surface of said movement-instruction-record means in outwardly projecting surface relief therealong whereby to retainingly be received by a corresponding receiving portion of said following head means during and throughout relative movement thereof.

20. Apparatus as defined in claim 1, in combination with and taking the form of a control and operating portion of a quilting machine, comprising: quilting material handling means including a plurality of quilting material layer supply mandrel-reel means, intermediate positioning and feeding means, and composite quilting material takeup mandrel-reel means, provided with an carried by a common, laterally shiftable platform means; underlying frame means and transversely slidable mounting means mounting said platform means for transverse slidable shifting movement relative to said underlying frame means; and multiple power reciprocatable needle means and power head means mounting same adjacent to an intermediate sewing region positioned adjacent to an effectively between longitudinally spaced paired rollers of said intermediate positioning and feeding means for reciprocation relative thereto and effective sewing of corresponding portions of quilting material when positioned in said intermediate sewing region during longitudinal movement thereof through the quilting material handling means.

UNITED STATES PATENT OFFICE
CERTIFICATE OF CORRECTION

Patent No. 3,583,340                Dated  June 8, 1971

Inventor(s)  Frank L. Dahl and John Robier

It is certified that error appears in the above-identified patent and that said Letters Patent are hereby corrected as shown below:

Column 17, line 62, "reacting" should read -- reading -- .

Signed and sealed this 3rd day of December 1974.

(SEAL)
Attest:

McCOY M. GIBSON JR.                C. MARSHALL DANN
Attesting Officer                  Commissioner of Patents